Patented June 24, 1924.

1,498,639

UNITED STATES PATENT OFFICE.

DAVID S. PRATT, OF PITTSBURGH, PENNSYLVANIA.

ARSENICAL COMPOSITION AND METHOD OF MAKING SAME.

No Drawing.     Application filed December 2, 1919. Serial No. 341,962.

*To all whom it may concern:*

Be it known that I, DAVID S. PRATT, a citizen of the United States, residing at Pittsburgh, in the county of Allegheny, State of Pennsylvania, have invented certain new and useful Improvements in Arsenical Compositions and Methods of Making Same; and I do hereby declare the following to be a full, clear, and exact description of the invention, such as will enable others skilled in the art to which it appertains to make and use the same.

The present invention relates to a new and improved composition suitable for use in preparing arsenical dips, for cattle, sheep, etc., and also to a method for producing such a composition.

The invention relates to compositions containing combinations of an alkali arsenite, alkali salts of phenols, cresols, or other substituted phenols, e. g., chlor-, nitro-, or sulfonic acid derivatives of phenol, cresol, etc., and soaps.

Cattle dips are used very extensively, especially to kill ticks, and when so used for official dipping, must meet certain requirements established from time to time by the United States Bureau of Animal Industry. These requirements specify (1) the content of arsenious oxide must be such that the dip may be diluted one volume to 127 volumes of water and give a dipping liquor containing 0.22 to 0.24 per cent of arsenious oxide; (2) the sodium salts of cresols and soap together must equal the arsenious oxide in the concentrated product; (3) the soap must equal at least one-half of the arsenious oxide; (4) the arsenical cattle dip must remain homogeneous at 32° F. or become homogeneous on warming; (5) when poured into a four-foot depth of water at 20° C. (66° F.) it must dissolve before reaching the bottom; (6) the specific gravity will be between 1.39 and 1.42. Greater dilution of the dip is used for non-official dipping.

These requirements were established to govern a concentrated liquid, aqueous solution of the various active ingredients, because there has not heretofore been available in dry form a material which would dissolve in the proper amount of water to give a dipping liquor meeting the Government requirements for official or non-official dipping.

It is evident that users of arsenical dips have been under the necessity of paying large sums to cover freight charges on shipping because of the water content of the concentrated dips, and also have had to handle these dangerously poisonous and caustic liquids.

The present invention eliminates these great disadvantages and provides a composition for use in the preparation of dips in the form of a convenient dry powder which will dissolve readily in water to give a dipping liquor which can be used in much the same manner as dipping liquors now employed.

The usual methods of evaporation, when applied to a solution of arsenical dip meeting the requirements outlined above, do not result in the production of a suitable dry product, due to the nature of the ingredients. With prolonged heating of the dip during evaporation, the alkali salts of such weakly acidic substances as phenols, cresols, etc., are subject to objectionable hydrolysis or decomposition, with resulting change in the composition and loss of active ingredients with resulting depletion in the final product.

I have nevertheless found it possible to effect the production of a satisfactory dry product if the materials are properly compounded at the outset, and if the evaporation of the arsenical solutions is carried out under special conditions, i. e., with rapid and almost instantaneous removal of the water, the evaporation being effected rapidly and at a low temperature. Dry arsenical compositions can thus be produced with varying amounts of the ingredients, as well as with variations in the ingredients themselves. The arsenical content may thus be in the form of sodium or potassium arsenite; and the soaps may be either potash or soda soaps, or mixed soda and potash soaps in such proportions as will give to the product the requisite degree of solubility. The alkali salts of phenols, cresols, etc., may be sodium or potassium salts, and the phenols or cresols may be the simple unsubstituted phenol or cresols, or they may be substituted phenols or cresols, as above pointed out. In the preferred embodiment of the invention, the dry composition is so compounded that it is available for use, by dissolving it in water, to give a dipping liquor meeting the Government requirements for official or non-official dipping. That is, the preferred composition contains, in a dry and finely divided state, sodium arsenite, sodium cresylate and soap, in such percentages that the sodium salts of the cresols and soap together equal the content of arsenious oxide, and the soap itself equals at least half the arsenious oxide content.

The production of the dry composition can be effected by various methods of procedure. If the solution is properly compounded at the outset it can be directly evaporated, by conducting the evaporation in a careful and regulated manner, to form a dry, finely divided product. If the solution is not properly compounded, there is a tendency for the phenylate or cresylate to be decomposed with resulting loss of cresylic acid. This difficulty can be avoided, however, by proper compounding of the solution.

A solution of sodium cresylate in water can be subjected to evaporation, if proper precautions are taken, without objectionable hydrolysis and loss of cresylic acid. In the presence of sodium arsenite $NaAsO_2$, which is strongly alkaline to litmus, I have found that there is an objectionable tendency for the sodium cresylate to be decomposed with loss of cresol during concentration. In particular, if the sodium cresylate and sodium arsenite are present in the proportions corresponding to those hereinbefore mentioned, this tendency toward decomposition and loss of cresol may be considerable. Nevertheless, I have found that if the amount of sodium hydroxide present is somewhat increased, objectionable decomposition and loss of cresol can be avoided. The excess sodium hydroxide may thus be, for example, from 50 to 70 per cent in excess of that normally combined with the arsenic as sodium arsenite. That is, if 28 parts of sodium hydroxide are required to combine with 70.6 parts of commercial white arsenic, the excess sodium hydroxide may amount to 15 to 20 parts.

Accordingly, in order to prepare a composite dry product from a concentrated solution of arsenical dip, I prefer to use a concentrated solution containing the same active ingredients as are contained in the official dip hereinbefore referred to, but with an excess of caustic alkali over and above what would normally be employed.

In the preferred practice of this invention, such a solution is atomized, by compressed air, into a warm chamber maintained at ordinary pressures just sufficient to carry off the steam resulting from the evaporation, i. e., a current of warm air is passed through the chamber at the proper rate, thereby maintaining a pressure therein but slightly below or slightly above that of the atmosphere,—for example, a pressure corresponding to one inch of water below atmospheric pressure. The water content of the solution is thus removed very rapidly and the solids contained in the solution fall to the floor of the chamber in the form of a dry powder requiring no pulverizing or further treatment.

In the preferred practice of the invention, the temperature of the chamber into which the spray is introduced is maintained at about 215° to 250° F., and the air entering the chamber for carrying off the moisture is admitted at about 260° F., and should not ordinarily fall below 215° F. The size of the resulting particles can be regulated to some extent by varying the specific gravity of the solution used, altering the construction or adjustment of the sprayer, and modifying the conditions of temperature and pressure. In any event, however, the spray should introduce the solution into the chamber in the conditi.. of a fine mist and the conditions of temperature should be such as to insure deposition of the solids as a dry powder, the moisture being removed at a sufficiently rapid rate so that it does not interfere with the normal continuous deposition of the material.

Instead of using a composite solution containing the ingredients of the final product, a similar product can be produced by following alternative procedures, and, in this way, any large excess of sodium hydroxide can be avoided.

The desired ingredients can thus be prepared in the form of three separate solutions, namely, of arsenite, cresylate and soap, and these separate solutions can then be dried by atomizing them into a drying chamber in a manner similar to that above described; and the resulting finely divided products can then be compounded in the desired proportions. Furthermore, the three separate solutions can be atomized in the same drying chamber, in proper proportions, so that there will be produced directly a composite, dry product containing the three ingredients in the desired proportions.

Alternatively, a solution of cresylate and soap and a separate solution of the alkali arsenite can be separately dried by spraying into the drying chamber, or these two solutions can be sprayed into the same drying chamber and a composite product directly produced.

Where the separate solutions, either of individual ingredients or of two or more ingredients, are simultaneously atomized into the same drying chamber, regulation can be readily effected of the amounts of the different solutions so that the proportions of ingredients in the final composite product will be that desired.

The new dry arsenical composition is a uniform, fine grained powder, consisting of fine individual particles. The fineness and uniformity of the new product render it readily soluble in water, to give a cattle dip possessing the requisite arsenic content and composition. The new product is eminently well adapted to shipping in ordinary containers, and, because the inert water has been largely if not entirely removed, the weight corresponding to the arsenic content of other known arsenical cattle dips is only approximately half as great.

It will accordingly be seen that the new dry composition of the present invention is available for use in the same manner as the concentrated dip liquors heretofore produced, and that it may be made containing the same or substantially the same ingredients as such concentrated liquors, without, however, the large amount of water accompanying them. The dry product of the present invention can nevertheless be used, by dissolving it in the proper amount of water, to produce dipping liquors of definite arsenical content, for example, such as conform to the Government requirements for official dipping. Solutions of a more dilute or more concentrated character can, of course, be produced if desired.

In addition to the specific ingredients above referred to, other ingredients can be added which will add to the value of the dry product for its intended purposes; but any such added ingredients should not be of a character which will interfere with the desired action of the other ingredients when used in the manner described.

I claim:—

1. The method of producing a dry arsenical composition suitable for use in preparing dips of any desired concentration by dissolving in the requisite amount of water, which comprises subjecting arsenical solutions containing phenolic and soap ingredients to spray evaporation to produce a dry product without objectionable decomposition of the ingredients; substantially as described.

2. The method of producing a dry arsenical composition suitable for use in preparing dips of any desired concentration by dissolving in the requisite amount of water, which comprises spraying arsenical solutions containing phenolic and soap ingredients in the form of a fine mist into a heated chamber and precipitating the solids therein in a condition of fine subdivision, easily soluble in water; substantially as described.

3. The method of producing a dry arsenical dip composition containing such proportions of alkali arsenite, alkali salts of phenolic compounds, and soap as may be desired, which comprises spraying solutions of these ingredients in the form of a fine mist into a heated chamber and precipitating the ingredients in a condition of fine subdivision easily soluble in water; substantially as described.

4. The method of producing a dry arsenical dip composition containing sodium arsenite, sodium cresylate and soap, in such percentages that the sodium salts of the cresols and soap together equal the content of arsenious oxide and the soap itself equals at least half the arsenious oxide content, which comprises spraying a concentrated solution of these ingredients containing an excess of alkali into a heated chamber in the form of a fine mist, continuously drawing off the moisture from said chamber, and precipitating the solids therein in a condition of fine subdivision easily soluble in water; substantially as described.

5. An arsenical dip comprising a dry composition containing arsenical, phenolic and soap ingredients, said composition being readily soluble in water, in the form of particles of practically uniform fineness produced by drying a liquid spray and requiring no further grinding; substantially as described.

6. An arsenical dip comprising a dry composition readily soluble in water, consisting of alkali arsenite, alkali salts of phenolic compounds, and soap; substantially as described.

7. An arsenical dip comprising a dry composition readily soluble in water, in the form of particles of practically uniform fineness requiring no further grinding, and consisting of alkali arsenite, alkali salts of phenolic compounds and soap; substantially as described.

8. An arsenical dip consisting of a dry composition readily soluble in water, in the form of particles of practically uniform fineness requiring no further grinding, and containing sodium arsenite, sodium cresylate, and soap in such proportions that the sodium salts of the cresols and soap together equal the content of arsenious oxide, and the soap itself equals at least half the content of arsenious oxide; substantially as described.

In testimony whereof I affix my signature.

DAVID S. PRATT.